United States Patent [19]

Beaird

[11] 3,875,556
[45] Apr. 1, 1975

[54] POSITIVE SEAT BELT INDICATOR SYSTEM

[76] Inventor: Jesse B. Beaird, 2769 N.W. 17th St., Oklahoma City, Okla. 73107

[22] Filed: Jan. 9, 1974

[21] Appl. No.: 432,114

[52] U.S. Cl. ............ 340/52 E, 340/278, 307/10 SB, 180/82 C
[51] Int. Cl. ............................................ B60r 21/00
[58] Field of Search .................. 340/52 E, 53, 278; 307/10 SB; 180/82 C

[56] References Cited
UNITED STATES PATENTS

| | | | |
|---|---|---|---|
| 2,510,115 | 6/1950 | Jakosky | 340/278 |
| 3,074,055 | 1/1963 | Rudolph et al. | 340/278 |
| 3,112,467 | 11/1963 | Benning | 340/52 E |
| 3,126,227 | /1964 | Bollinger, Jr. | 340/52 E X |
| 3,359,539 | /1967 | Fink | 340/53 |
| 3,624,601 | 11/1971 | Routzahn et al. | 340/52 E |

Primary Examiner—Alvin H. Waring
Attorney, Agent, or Firm—Sughrue, Roghwell, Mion, Zinn & Macpeak

[57] ABSTRACT

A vehicle operator dials into an internal and external visual indicator system the total number of occupants of the vehicle, then by operating each of the individual seat position switches, corresponding to each of the respective seat positions in the vehicle, the vehicle operator designates, by visual indicator, both internally and externally, the respective seat positions that are occupied by a passenger; after which each individual passenger, and the vehicle operator, by coupling their individual seat belt, opens their respective circuit and thereby extinguishes the individual visual indicator, both interiorly and exteriorly, related to their respective seat position, showing compliance or exposing noncompliance of each of the seat position occupants in the vehicle with regard to governmental seat belt coupling requirements.

16 Claims, 6 Drawing Figures

POSITIVE SEAT BELT INDICATOR SYSTEM

BACKGROUND OF THE INVENTION

1. Field of the Invention

This invention relates to seat belt indication system for automotive vehicles and more particularly to systems which insure compliance on the part of the occupant by readily indicating externally of the vehicle compliance or noncompliance.

2. Description of the Prior Art

Seat belt indicators both interiorly and exteriorly visible have been employed in the automotive field for indicating compliance with governmental requirements that each occupant couples his seat belt when occupying a vehicle. Further, systems presently in use interlock electrically the ignition system with the seat belt and prevent operation of the vehicle or activate audio and visual alarms as a result of noncompliance which alarms may be seen and/or heard internally and externally. In the present systems, it is difficult if not impossible for a police officer or other monitor external of the vehicle to easily ascertain the number of occupants within the car, and those occupants, which have or have not complied with seat belt coupling requirements.

SUMMARY OF THE INVENTION

The present invention requires a correlation of activity between the driver and individual occupants of an automotive vehicle to complete appropriate electrical circuits and which visually indicate complaince within and without the vehicle of the statutory requirements of a State, Federal or local nature, with respect to coupling of a seat belt about the occupant at given seat positions. The system operates on the principle that the automotive vehicle has set seat positions normally numbering six for a two seat vehicle in which each seat position has a seat belt consisting of two belt segments or sections, which when closed, operate an electrical switch in conjunction therewith. A console positioned adjacent the vehicle operator in the front seat is provided with individual seat position selector switches which the driver switches to closed position by counting the occupants and ascertaining their individual seat position. In addition, the operator operates a totalizer selector switch to energize an appropriate circuit indicating both internally and externally the total number of persons occupying the vehicle.

In turn, the coupling of the seat belt sections by all occupants including the operator automatically extinguishes lights both interiorly and exteriorly of the vehicle representing respective occupied seat positions, thus indicating that they have all properly completed their requirements of coupling the belt sections. Failure to position the totalizing selection switch at the proper position by the vehicle operator may be readily ascertained by a policeman or other authority officer who can visually ascertain the number of occupants through the vehicle windows and correlate that to the visual display exterior of the vehicle. A failure to couple seat belt sections at a given seat location by an occupant is also visually ascertained both exteriorly and interiorly by the light correlated to that seat position which will remain lit. Preferably, in addition to energizing a correlated colored display light for the total number of seats occupied, a digital indicator, by the appearance of a corresponding numeral further indicates the total number of occupants within a vehicle.

Preferably, the seat position indicators within the console for the front and rear seats of a six passenger automotive vehicle are in order; from left to right and from front seat to rear seat, red, white, blue, amber, green and purple lights. Further, front and rear external signal light assemblies carried by the vehicle body consist essentially of a planar display panel having a variable, relatively large color control light at the center; and smaller red, white, blue, amber, green and purple seat position lights, and a digital display of the total number of occupants. Alternatively, to the left and right of the center light for each of the front and rear signal light assemblies, a high intensity blue pencil light lies behind transparent slots within an otherwise opaque panel. Groups of slots meet at a common apex at the bottom or top, and are three in number to each side of the control light. The middle slot corresponds to the center seat position for both the front and rear seat and is vertical, and the left and right front and rear seat positions constitute slots inclined to each side thereof in opposite directions. The apex or intersection of the slots of each group may appear either at the top or the bottom of the signal light panel as desired. The control light may constitute an opening within which one or more bulbs of different colors can be selectively energized to provide a proper color indicative of the total number of occupants within the vehicle, while at another portion of the front and rear signal light assembly, individual lights in parallel with those lights at the driver's console and of like color indicate the seat positions which are occupied but where the occupant has failed to fasten the seat belt sections.

DESCRIPTION OF PREFERRED EMBODIMENTS

Figure 1:
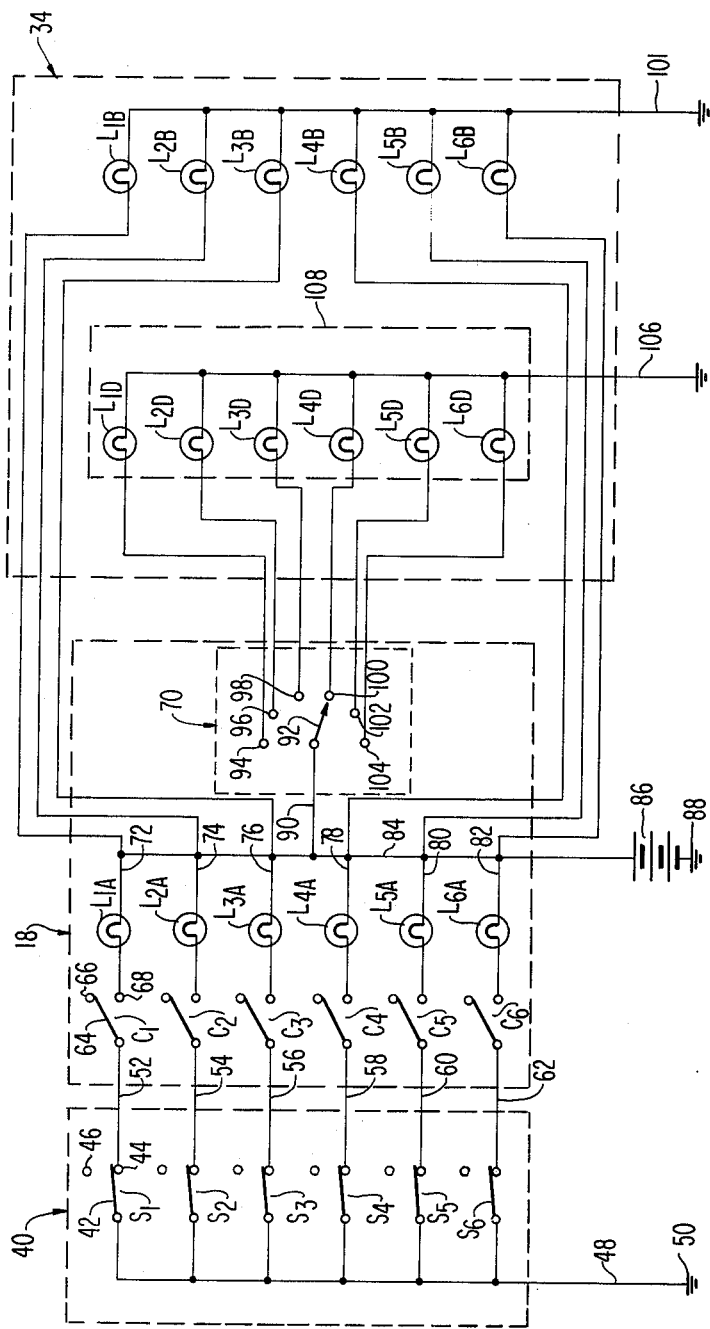
FIG. 1 is an electrical schematic diagram of one embodiment of the positive seat belt indicator system of the present invention as employed with a two seat, six passenger automotive vehicle.

Referring to the drawings, a vehicle indicated generally at 10 has its vehicle body 12 forming a passenger compartment 14. Front seat 16 faces the vehicle dashboard 19 within which resides, a specially formed console 20. Within the rear of the passenger compartment 14, there is provided a rear seat (not shown) which extends the width of the vehicle. Thus, there are defined left, middle and right, front seat vehicle occupant positions as well as left, middle and right, rear seat vehicle occupant positions. Under statutory requirement, seat belts must be provided for all vehicle occupant positions, as illustrated. Each seat belt consists of two segments or sections which are buckled together by metal coupling members. In this respect, for the driver seat, belt segments 22 and 24 are coupled together by coupling members 26 and 30 for respective sections. Although only a standard, two segment "lap" seat belt is shown, the invention may be utilized with a shoulder restraining strap, a shoulder harness or any restraining arrangement wherein two or more restraining members are coupled together by the seat occupant. Switch means, responsive to coupling and decoupling, complete an electrical circuit when the sections are not coupled. In addition to the console on the dashboard, there is provided on the rear of the vehicle on the trunk, for instance, an external, rear, signal light assembly 34 while preferably the vehicle may carry a second signal light assembly on the front of the vehicle or facing forwardly. Each assembly consists essentially of the same components with the electrical indicator lights within one assembly being electrically connected in parallel with those within the other assembly to indicate simultaneously but in opposite directions the conditions of the seat belts with respect to the vehicle occupants within the vehicle.

Turning to FIG. 1, the electrical circuit is divided into three parts, essentially; a seat belt section 40, a console section 18, and the rear signal lightsection 34. With respect to the seat belt section 40, there are six switches identified as $S_1$ $S_2$ $S_3$ $S_4$ $S_5$ and $S_6$ relating to respective seal belt locations. Switches $S_1$ through $S_6$ being single pole — single throw normally closed switches. A movable switch contact 42 for each switch, moves from fixed contact 44 to fixed contact 46 to break the circuit at that point at the time that the occupant couples the seat belt section. With respect thereto, a common line 48 is grounded at 50 while electrical leads 52 through 62 for respective occupant positions extend from the seat belt section to console 18. Leads 52 through 62 are electrically connected to the individual seat position selector switches $C_1$ through $C_6$. The seat position selector switches constitute single pole, single-throw, normally open switches, which may be of the push-pull type or of toggle type. As an example, the movable contact 64 at switch $C_1$ switches from fixed contact 66 to fixed contact 68 closing the switch and completing the circuit to an indicator light or lamp associated therewith. The lights $L_{1A}$ – $L_{6A}$ extend in a row across the surface of the console 18 and indicate the seat belt coupling or uncoupling condition at seat positions. Light $L_{1A}$ coupled to switch $C_1$ corresponds to the left front seat or driver position, while light $L_{6A}$ is energized upon closing of console switch $C_6$, and de-energized by opening of switch S-6 associated with the rear right seat belt position. Lines 72 through 82 respectively complete the circuits from the individual seat position selector switches on the console and console lamp for each seat occupant position via common line 84 which carries a 12 volt D.C. source grounded at 88.

A line 90 from common line 84 extends to the rotary contact 92 of the totalizer selector switch 70 which rotates relative to fixed contacts 94 through 104 and controls, in turn, energization of lights $L_{1D}$ through $L_{6D}$ forming a part of the external signalling light assembly 34, these lights being connected to ground by a common line 106. In addition, parallel lines lead from each of the console switch positions $C_1$ through $C_6$ to a second series of lights or lamps $L_{1B}$ through $L_{6B}$ corresponding to seat belt switches $S_1$ through $S_6$ and thence to ground via common line 101 for energization of those lights within the external signal light assembly 34.

Figure 2:
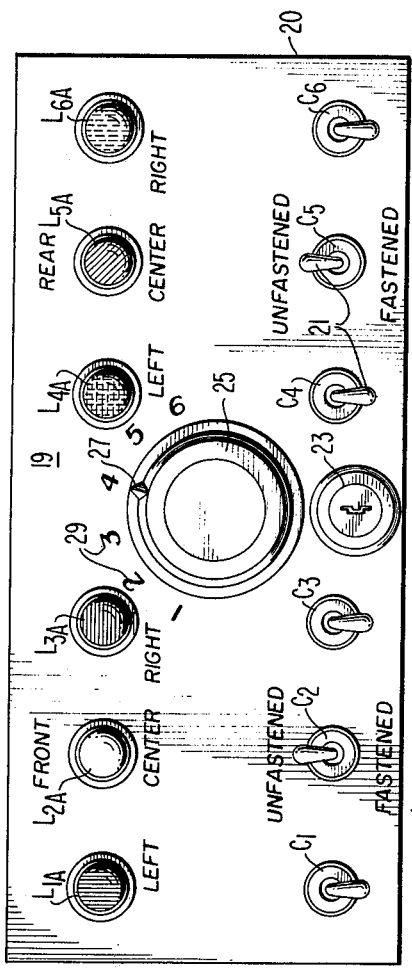
FIG. 2 is an elevational view of the vehicle dash console forming a part of the system of FIG. 1.
Figure 3:
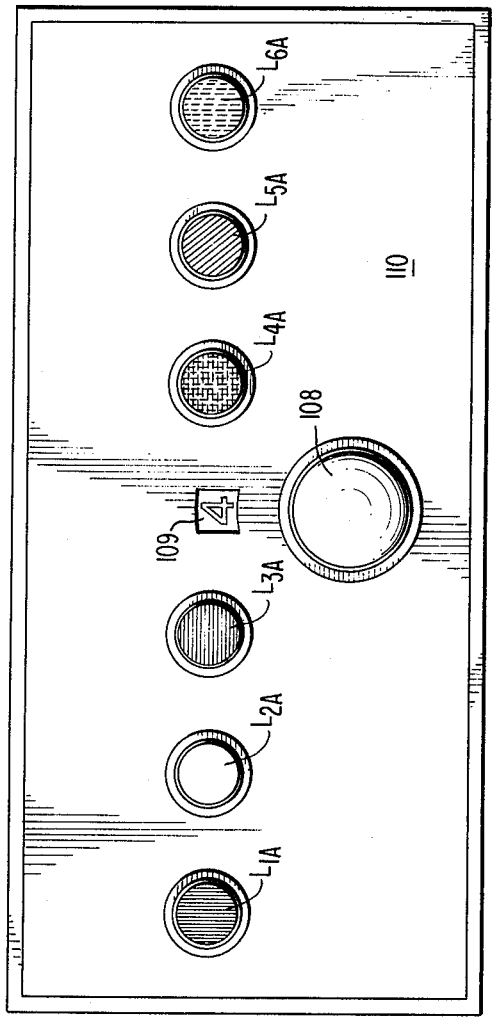
FIG. 3 is an elevational view of one of the external signal light assemblies forming a component of the system of FIG. 1.

Preferably, lights $L_{1A}$ through $L_{6A}$, lights $L_{1D}$ through $L_{6D}$ and $L_{1B}$ through $L_{6B}$ are color coded, that is, the lights have given colors representing seat positions. For instance, front left seat position is red, front middle seat position is white, front right seat position is blue, rear left seat position is amber, rear middle seat position is green, and rear right seat position is purple. It should be remembered that lights $L_{1D}$ through $L_{6D}$ are positioned within the center of signal light assembly panel 110, FIG. 3, that is, they selectively illuminated a single circular area defined by panel opening and are all positioned in an array behind window 108. Further, a diogital display as at 109 may be achieved by parallel digital (not shown) in a manner which is conventional within the digital display art. The color of the digital display 109 should correspond to the color exhibited at window 108. While the lights have been described as being colored, the light bulbs employed may give off white light and color effected by filters or lenses. Reference to FIG. 2 illustrates the console 20 in which mounted to the reverse side of panel 19 are normally open toggle switches $C_1$, $C_2$, $C_3$, $C_4$, $C_5$ and $C_6$. In this case, toggle actuators 21 protrude from the front of the panel. Also, in addition to ignition switch 23 and lights $L_{1A}$ through $L_{6A}$, the rotary control knob 25 for the totalizer selector switch 70 permits dialing in the total number of occupants. Knob 25 has pointer 27 which faces numerals 29. Numerals 29 may be illuminated in the same color as indicator opening 108 to facilitate night operation, by any means known in the art. The pointer 27 is shown as pointing to the numeral 4 indicating that the operator of the vehicle has dialed into the system four occupants. The toggle switch actuators are set for the four occupants which at that time occupy given seat positions within the vehicle. The seat positions occupied can be readily ascertained as seat positions 1, 3, 4 and 6 because toggle switch actuators 21 at these positions have been shifted from circuit open to circuit closed positions, that is, from up to down.

In operation, when the belt sections are joined or coupled, the switches at the seat positions corresponding to mechanical coupling of the seat belt sections are switched from normally closed to open position, the normally closed position being shown in FIG. 1 for all six seat belt locations. The operator of the vehicle occupying the front left seat position corresponding to seat belt switch $S_1$ dials in the number of occupants, this being four in number, in addition to which he moves the toggle switch actuators 21 for seat positions 1, 3, 4, and 6 fron the switch open to switch closed position. Thus, with reference to FIG. 1, movable switch contact 42 for seat belt switch $S_1$ moves from fixed contact 44 to fixed contact 46 opening the switch and thus a circuit through common lead 48 from ground point 50 and leads 52 to lead 72 while at the same time, the operator in moving toggle switch actuator 21 at switch position $C_1$ on the console 18 moves the movable contact 64 from the fixed contact 66 to fixed contacts 68, thus attempting to close the circuit and thus energizing light $L_{1A}$ on the console 20 which would normally be lit through the common connection 84 to ground 88 via source 86, absent seat belt coupling. At the same time, the operator of the vehicle operates the totalizer selector switch by rotating knob 25 to the number 4 position thus energizing light $L_{4D}$ by rotation of rotary contact 92 to fixed contact 100. As a result, an amber light within indicator opening 108, associated with the signal light assembly 34, is lit, and simultaneously therewith the digital display, at 109, is illuminated in the same color. The operator further closes the switch $C_3$ indicating an occupant in the front right seat position, switch $C_4$ indicating an occupant in the rear left position, and switch $C_6$ indicating occupancy of the vehicle by an occupant in the right rear seat position. This is achieved by moving the toggle actuators associated with switches $C_1$, $C_3$, $C_4$ and $C_6$ on dash console 20. In the absence of occupants at their seat positions coupling or buckling their seat belt sections, energization of lights $L_{1B}$, $L_{3B}$, $L_{4B}$ and $L_{6B}$ would result within assembly 34. However, assuming that the occupants all properly couple their seat belts about themselves, the only visible external indication will be through opening 108, in which case an amber light corresponding to light $L_{4D}$ is lit indicating four occupants within the vehicle, all of whom have properly coupled their seat belt sections, and through digital display 109.

Figure 6:
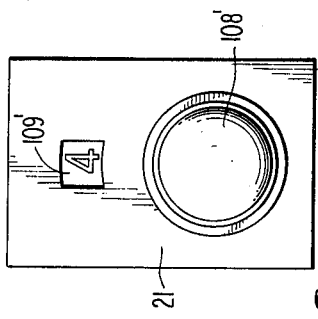
FIG. 6 is an elevational view of the internal indicator light assembly forming a part of the system of the present invention.

In addition to these external indicators, indicators may be provided within the vehicle visible to the operator thereof. FIG. 6 shows such a display wherein internal indicator opening 108' and internal digital display 109' function similarly to the aforementioned external displays and are connected in parallel therewith. Panel 21 may be located adjacent to console 20 or anywhere within the vehicle so as to be easily viewed by the driver.

From the above, it is seen that the vehicle operator must count the number of occupants in the vehicle and he must turn his selector switch so as to close circuits indicating both externally and internally the number of persons occupying the vehicle by setting up external and internal visual indicators in terms of colored lights indicative of particular seat positions, the absence of the occupants at given seat positions, and the coupling of belt sections or failure to do so by those occupants. Each occupant in closing the seat belt sections opens a switch associated therewith, extinguishing respectively a light $L_{1A}$ through $L_{6A}$ and $L_{1B}$ through $L_{6B}$ corresponding thereto to indicate proper completion of the statutory requirements of coupling the seat belt sections.

Figure 5:
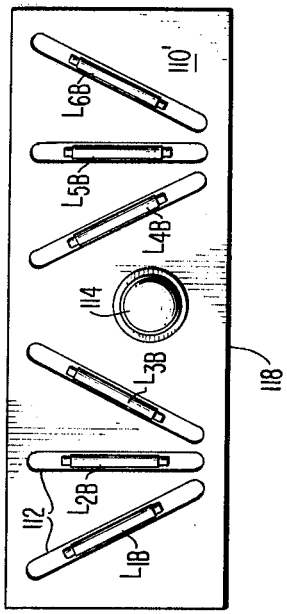
FIG. 5 is an elevational view of an alternate form of external signal light assembly forming a component of the system illustrated in FIG. 1.
Figure 4:
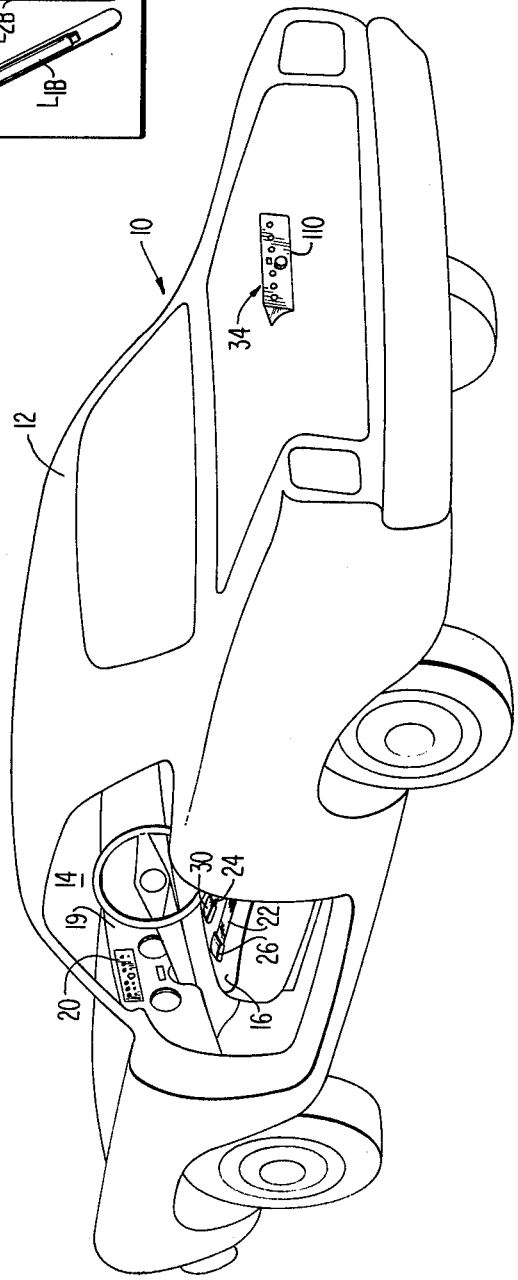
FIG. 4 is a perspective view of a vehicle incorporating the positive seat belt indicator system of the present invention.

Reference to FIG. 5 illustrates an alternative form for the front and/or rear signal light assembly, wherein the panel 110' which is opaque, is provided with open, transparent, or translucent slots 112 numbering six, which form two arrays on respective sides of a control light 114. Light 114 is variably colored depending upon which lamp or light $L_{1D}$ through $L_{6D}$ is lit employing the circuit arrangement of FIG. 1. Further, lights $L_{1B}$ and $L_{6B}$ of that circuit take the form of high intensity blue pencil bulbs positioned behind and aligned with slots 112 from left to right respectively to give recognition at greater distances due to the contrast. While the apex for each group of slots 112 are at the bottom of the panel 110', the position could be reversed or alternatively, the slots 112 could all be vertical, but equally spaced horizontally depending upon what type of array may be more readily seen and distinguished at a given distance from the vehicle by a policeman or other person of authority adjacent the roadway over which the vehicle travels. In conformance with the prior embodiment, the control light 114 would be red, white, blue, amber, green or purple depending upon the number of occupants, the position of a given occupant who has failed to couple the seat belts sections, conformance with the statutory authority would be readily indicated by which the lights $L_{1B}$ through $L_{6B}$ are energized, giving off a high intensity blue light at the slot associated therewith. The face of the panel 110' may be chrome plated to enhance light contrast and viewability.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a display system for visually displaying externally of an automotive vehicle the state of the vehicle seat belts at seat positions corresponding to the vehicle occupants, including: a two section seat belt at each vehicle occupant seat position and first switch means operatively associated with said seat belt sections and responsive to seat belt coupling, and a non-occupant viewable electrical indicator provided on the vehicle exterior for indicating coupling or uncoupling at each occupant seat position, the improvement comprising:
   second switch means operable by the vehicle driver for each occupied seat position, and
   third switch means operable by said driver and movable to a position representing the total number of occupants within the vehicle, and
   wherein said external indicator includes indicator means responsive to operation of said first, second and third switch means to indicate the total number of occupants within the vehicle and the failure of a given occupant to couple his seat belt sections and the seat position of said given occupant.

2. The indicator system as claimed in claim 1, wherein said automotive vehicle includes a console within the vehicle passenger compartment, adjacent the vehicle driver and said second switch means comprises a set of normally open switches carried by said console corresponding to vehicle seat positions and connected to said first switch means, and said console further includes lights corresponding respectively to said seat positions and being connected to said second switch means and responsive to operation of said first switch means and said second switch means to indicate to the driver in the manner of the exterior indicator, the failure of said given occupant to couple his seat belt sections.

3. The indicator system as claimed in claim 2, wherein said first switch means comprises normally closed switches and being open in response to seat belt coupling, said second switch means comprises normally open switches for selective closure by said vehicle driver and said lights carried by said console corresponding to said seat positions are series coupled respectively to said normally open switches carried by said console such that said lights are de-energized in response to said driver operating respective second switch means corresponding to occupied seat positions and the occupant operating said first switch means by coupling of said seat belt sections.

4. The indicator system as claimed in claim 2, wherein said external indicator comprises a control signal light assembly including a panel supporting individual lights corresponding to respective seat positions, and said external individual lights are coupled in parallel with respective console lights.

5. The indicator system as claimed in claim 3, wherein said external indicator comprises a control signal light assembly including a panel supporting individual lights corresponding to respective seat positions, and said external individual lights are coupled in parallel with respective console lights.

6. The indicator system as claimed in claim 3, wherein said seat position lights of both said console and control signal light assembly are correspondingly color coded.

7. The indicator system as claimed in claim 4, wherein said seat position lights of both said console and control signal light assembly are correspondingly color coded.

8. The indicator system as claimed in claim 5, wherein said seat position lights of both said console and control signal light assembly are correspondingly color coded.

9. The indicator system as claimed in claim 4, wherein said vehicle comprises a six passenger vehicle having a front and rear seat and said seat position indicator lights of said control light signal light assembly are color coded from left to right and from front to rear in order; red, white, blue, amber, green and purple.

10. The indicator system as claimed in claim 6, wherein said vehicle comprises a six passenger vehicle having a front and rear seat and said lights within said console and said control signal light assembly are color coded correspondingly to seat positions from left to right and from front to rear in order; red, white, blue, amber, green and purple.

11. The indicator system as claimed in claim 1, wherein said external indicator comprises a series of lights corresponding to vehicle seat positions, said first switch means comprises single pole, single throw, normally closed switches, said second switch means comprises normally open, single pole, single throw switches, said third switch means comprises a rotary selector switch having a single movable contact and a series of fixed contacts corresponding to said vehicle seat positions, said indicator means comprises different colored lights illuminating a common area and individually connected to respective fixed contacts of said rotary switch, said normally closed switch operatively associated with said seat belt sections and said normally open switches of said second switch means are connected in series and said rotary contact of said rotary selector switch is connected in common with all of said normally open switches of said second switch means and to an electrical source.

12. The indicator system as claimed in claim 11, wherein said normally open switches are mounted within a console within the passenger compartment of said vehicle adjacent the driver's seat position and said console further includes individual lights in series with said normally open switches and responsive to closure thereof and indicating the absence of coupling of the seat belts at seat belt locations corresponding thereto.

13. The indicator system as claimed in claim 2, wherein said external indicator comprises a series of lights corresponding to vehicle seat positions, said first switch means comprises single pole, single throw, normally closed switches, said second switch means comprises normally open, single pole, single throw switches, said third switch means comprises a rotary selector switch having a single movable contact and a series of fixed contacts corresponding to said vehicle seat positions, said indicator means comprises different colored lights illuminating a common area and individually connected to respective fixed contacts of said rotary switch, said normally closed switch operatively associated with said seat belt sections and said normally open switches of said second switch means are connected in series and said rotary contact of said rotary selector switch is connected in common with all of said normally open switches of said second switch means and to an electrical source.

14. The indicator system as claimed in claim 13, wherein said normally open switches are mounted within a console within the passenger compartment of said vehicle adjacent the driver's seat position and said console further includes individual lights in series with said normally open switches and responsive to closure thereof and indicating the absence of coupling of the seat belts at seat belt locations corresponding thereto.

15. The indicator system as claimed in claim 3, wherein said external indicator comprises a series of lights corresponding to vehicle seat positions, said first switch means comprises single pole, single throw, normally closed switches, said second switch means comprises normally open, single pole, single throw switches, said third switch means comprises a rotary selector switch having a single movable contact and a series of fixed contacts corresponding to said vehicle seat positions, said indicator means comprises different colored lights illuminating a common area and individually connected to respective fixed contacts of said rotary switch, said normally closed switch operatively associated with said seat belt sections and said normally open switches of said second switch means are connected in series and said rotary contact of said rotary selector switch is connected in common with all of said normally open switches of said second switch means and to an electrical source.

16. The indicator system as claimed in claim 15, wherein said normally open switches are mounted within a console within the passenger compartment of said vehicle adjacent the driver's seat position and said console further includes individual lights in series with said normally open switches and responsive to closure thereof and indicating the absence of coupling of the seat belts at seat belt locations corresponding thereto.

* * * * *